United States Patent [19]

Anderson

[11] Patent Number: 4,848,816
[45] Date of Patent: Jul. 18, 1989

[54] HAMBURGER GRILL SPATULA

[76] Inventor: Rex A. Anderson, R.R. 1, Box 102, Esterville, Iowa 51334

[21] Appl. No.: 185,915

[22] Filed: Apr. 25, 1988

[51] Int. Cl.$^4$ ............................................... A47J 43/28
[52] U.S. Cl. ...................................... 294/7; 15/236.08
[58] Field of Search ........................................ 294/7–10, 294/32, 49, 51, 55, 55.5; 15/105, 236.01–236.09; 30/169, 172, 322; 99/352, 450; D7/99, 102, 104

[56] References Cited

U.S. PATENT DOCUMENTS

| D. 108,495 | 2/1938 | Hess | 30/322 X |
|---|---|---|---|
| 1,377,484 | 5/1921 | Huneryager | 15/236.08 X |
| 1,988,087 | 1/1935 | Peron | 294/7 X |
| 2,747,911 | 5/1956 | Kuever | 294/7 |
| 3,213,779 | 10/1965 | First | 294/7 X |

FOREIGN PATENT DOCUMENTS

| 388822 | 1/1924 | Fed. Rep. of Germany | 30/322 |
|---|---|---|---|
| 737471 | 7/1943 | Fed. Rep. of Germany | 30/322 |
| 442971 | 2/1936 | United Kingdom | 294/55 |

*Primary Examiner*—Johnny D. Cherry
*Attorney, Agent, or Firm*—Zarley, McKee, Thomte, Voorhees & Sease

[57] ABSTRACT

A hamburger spatula designed for use with charcoal grills, especially adapted to allow removal of hamburgers which ooze down into the grill below the top surface without destroying the integrity of the burger. The spatula has a rear base portion extended forwardly and terminating in a series of spaced-apart tines which dwell in a lower plane than a plane defined by the surface of the base portion. The base portion has a series of indent paths on the under-surface which allow for sliding receipt of the charcoal grill rods to allow the tines to extend below the surface. The tines can then be inserted underneath a charcoaled hamburger, which might have form-fried to the grill, to scoop it off without destroying it.

10 Claims, 1 Drawing Sheet

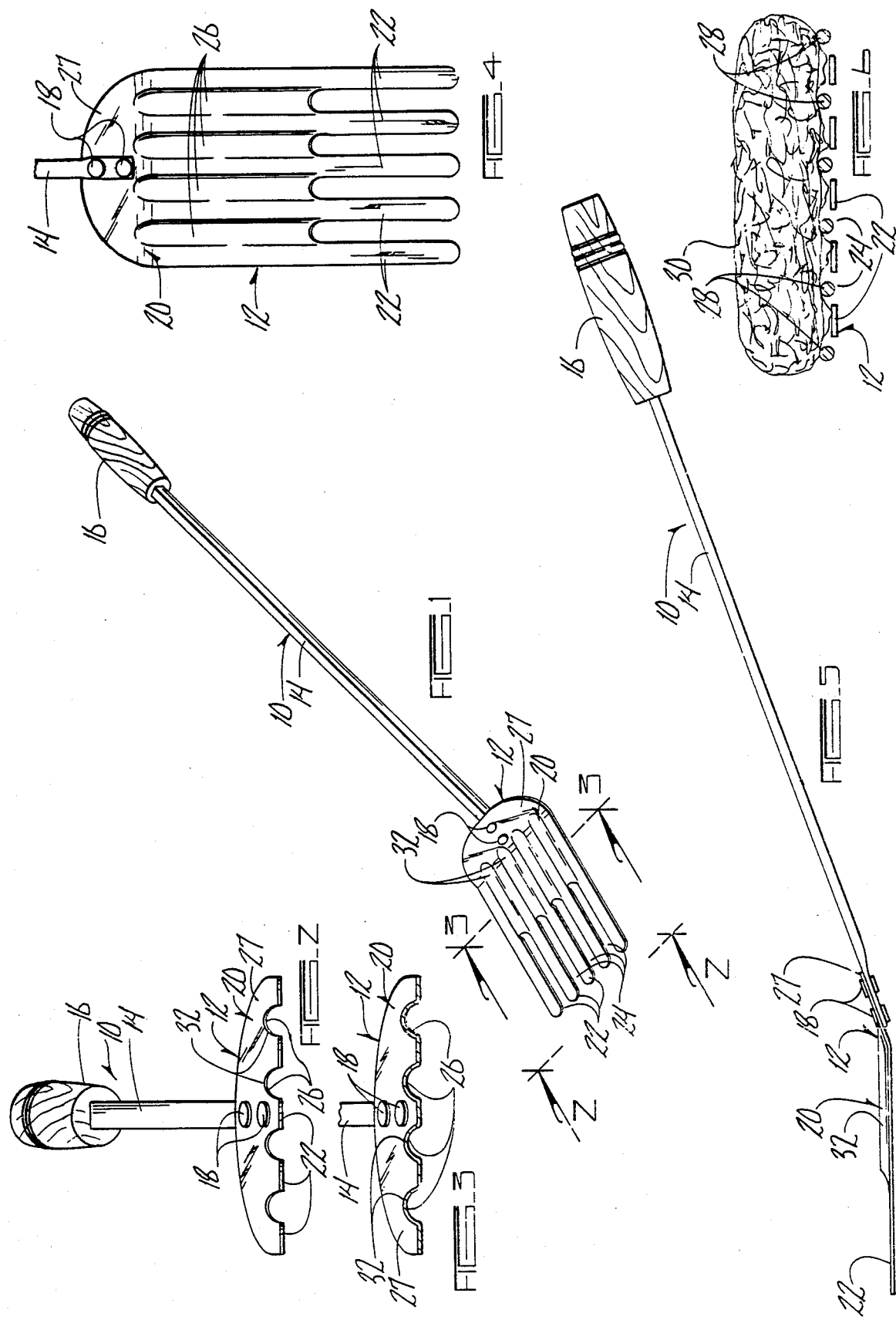

HAMBURGER GRILL SPATULA

BACKGROUND OF THE INVENTION

This invention relates to a spatula, particularly a spatula designed for use with charcoal grills.

Charcoal grilling hamburgers is a popular activity. It is involved with a variety of leisure activities. With the never-ending popularity of the hamburger, and particularly the charcoal grilled hamburger, in American outdoor activities, there continually is a need for improvement in the cooking utensils. One often-encountered problem with charcoal grilling of hamburgers is that the integrity of the hamburger patty is somewhat lost during the cooking process. Put another way, the patty fry-forms to the grill, with portions of the patty often sticking to the grill and oozing into the spaces between the grill rods. At best, this makes removal of the patty from the grill surface difficult and at worst it allows the integrity of the patty to be completely destroyed during removal, often accompanied by the hamburger falling into the grill.

This invention has as its primary objective the development of an improved hamburger spatula which allows fry-formed hamburgers to be easily removed from the grill, even if they have oozed into the spacing between the grill rods, making removal without destruction of the integrity of the burger considerably more difficult.

SUMMARY OF THE INVENTION

A hamburger spatula is provided with the spatula head having a rear base portion which extends forwardly and terminates in a plurality of forwardly extending spaced-apart tines. The tines dwell in a plane which is lower than the plane defined by the top surface of the rear base portion. In a preferred embodiment the base portion has a series of indent paths on its undersurface which allow for sliding receipt of the charcoal grill rods. This allows the tines to extend below the surface defined by the grill rods and function in a scooping or shoveling manner to allow recovery of a burger which has fry-formed to the grill.

BRIEF DESCRIPTION OF THE DRAWINGS

FIG. 1 is a perspective view of the hamburger spatula of the present invention.

FIG. 2 is a front end view along line 2—2 of FIG. 1 of the hamburger spatula of the present invention.

FIG. 3 is a sectional view along line 3—3 of FIG. 1, transverse to the longitudinal axis of the spatula.

FIG. 4 is an underside view of the base portion of the spatula.

FIG. 5 is a side view of the spatula head.

FIG. 6 shows a typical difficult-to-remove hamburger fry-formed to the grill in order to illustrate how the spatula of the present invention will allow for removal.

DETAILED DESCRIPTION OF THE INVENTION

The spatula, generally depicted at 10, is especially designed for use with charcoal grills (FIG. 6). The spatula 10 has a spatula head 12 and a handle portion which is comprised of a handle stem 14 and a handle 16. Handle stem 14 is attached to spatula head 12 at its rear portion by suitable fasteners, in this case rivets 18. Spatula head 12 has a rear or base portion generally designated as 20, which extends forwardly and terminates in a plurality of forwardly extending spaced-apart tines 22. Tines 22 define therebetween spaces 24.

The spatula head 12 at its base portion 20 has a plurality of spaced-apart indents 26, which extend from the rear portion of spaces 24 inwardly into the base portion 20 in order to define a series of paths which allow for sliding receipt of grill rods 28 in order to allow the tines 22 to be easily inserted under cooking hamburgers 30. It thus can be seen, particularly from the view of FIG. 2, that the top surface of spatula head 12, defined by a series of ridges 32, dwells in one plane which is transverse to the longitudinal axis of stem 14 and the tines 22 dwell in another plane transverse to the longitudinal axis of stem 14, which is lower than the plane in which ridges 32 dwell. In this manner, the ridges 32 coupled with the indents 26 on the bottom, define the indent paths which function as guides to slide along the long axis of rods 28 to allow tines 22 to function as shovels or scoops under the plane of rods 28. This allows a hamburger on the grill to be scooped therefrom. As a result, the hamburger, even if it has fry-formed to the grill, can be removed without destroying the integrity of the bulk of the burger patty.

Certain constructional features are worthy of brief mention. Spatula handle 16 should be made of wood or non-heat conductive material. Stem 14 can be made of stainless steel. Stem 14 can be rivet fastened 18 to the rear portion of spatula head 12, or fastened by any other suitable means. Spatula head 12 can be made by stamping from corrugated sheets of steel. The only requirement if corrugated sheets are used is that the spacing of the indents on the corrugated sheet must be selected so that they correspond to the spacing of rods 28 on conventional charcoal grills.

It can be seen that the invention accomplishes the objective in allowing grilling of burgers and even if they are fry-formed to the grill, they can be removed without disruption of the burger integrity.

What is claimed is:

1. A hamburger spatula designed especially for use with charcoal grills and having a plurality of generally parallel spaced apart grill rods, comprising:

a spatula head having an attachment portion, a rear base portion extending forwardly from said attachment portion and terminating in a plurality of elongated forwardly extending tines, each of said tines having a spaced therebetween, and a lowered base platform, connected at an oblique angle with the attachment portion and having generally flat surfaces defining a lowered plane;

said base portion including a series of spaced-apart raised, rounded ridges having tops forming a raised holding platform for holding a hamburger or other item generally in a raised plane parallel but spaced apart from said lowered plane of the tines, the raised plane being defined by the tops of the raised, rounded ridges, the undersides of which consist of spaced-apart indents extending from said spaces between said tines rearwardly into said base portion which define indent paths for sliding receipt of grill rods to allow said tines to be easily inserted under cooking hamburgers, the radius of curvature of each indent being just larger than the diameter of a corresponding grill rod, and the forward ends of the raised, rounded ridges including sloped transfer portions from the tines up to the tops of the ridges for sliding movement of a hamburger or other item from the lowered plane of the tines to the raised plane of the ridges for transport, handling, or removal of the hamburger or item from the rods of the grill; and a handle portion connected to said attachment portion of said rear base portion for hand grasping.

2. The spatula of claim 1 wherein said spatula base portion is made of a corrugated steel sheet.

3. The spatula of claim 1 wherein each of said tine spaces has a corresponding indent path in said base portion.

4. The spatula of claim 1 wherein said indent paths have a radius of curvature just larger than the diameter of the grill rods, said indents extending from the spaces to the attachment portion of the spatula head, the attachment portion angling away from the indents so that the grid rods abut the indents generally along the indent's entire length.

5. The spatula of claim 1 wherein said handle portion is rivet fastened to said attachment portion of said base portion.

6. A hamburger spatula designed for use with charcoal grills having a plurality of generally parallel spaced apart grill rods, comprising:

a spatula head having an attachment portion, a rear base portion extending forwardly from said attachment portion and terminating in a plurality of elongated forwardly extending space-apart tines, said rear base portion comprising a lowered base platform, connected at an oblique angle with the attachment portion and having generally flat surfaces defining a lowered plane, said tines extending from the base portion in said lowered plane, and said rear base portion also comprising a raised holding platform with raised, rounded rides forming a raised holding platform for holding a hamburger or other item generally in a raised plane parallel but spaced apart from said lowered plane of the tines, the raised plane being defined by the tops of the raised, rounded ridges;

each of said tines dwelling in said lowered plane generally defined by the lowered base platform which is lower than a raised plane generally defined by the raised holding platform of said base portion;

said base portion including a series of indents forming indent paths on the undersurface of the rounded ridges which allow for sliding receipt of charcoal grill rods to allow said tines to extend below the tops of said grill rods when slid along said grill rods, the radius of curvature of each indent being just larger than the diameter of a corresponding grill rod, the forward ends of the raised rounded ridges including sloped transfer portions from the tines up to the tops of the ridges for sliding movement of a hamburger or other item from the lowered plane of the tines to the raised plane of the ridges for transport, handling, or removal of the hamburger or item from the rods of the grill; and a handle portion connected to said attachment portion of said rear base portion for hand grasping.

7. The spatula of claim 6 wherein said spatula bse portion is made of a corrugated steel sheet.

8. The spatula of claim 6 wherein each of two adjacent tines have a corresponding indent path in said base portion.

9. The spatula of claim 6 wherein said indent paths have a radius of curvature just larger than the diameter of the grill rods, said indents extending from the spaces to the attachment portion of the spatula head, the attachment portion angling away from the indents so that the grill rods abut the indents generally along the indent's entire length.

10. The spatula of claim 6 wherein said handle portion is rivet fastened to said attachment portion of said base portion.

* * * * *